US012810215B2

(12) United States Patent
Sesha

(10) Patent No.: US 12,810,215 B2
(45) Date of Patent: Nov. 24, 2026

(54) SWARM LEARNING, PRIVACY PRESERVING, DE-CENTRALIZED IID DRIFT CONTROL

(71) Applicant: HEWLETT PACKARD ENTERPRISE DEVELOPMENT LP, Houston, TX (US)

(72) Inventor: Madhusoodhana Chari Sesha, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 931 days.

(21) Appl. No.: 17/954,906

(22) Filed: Sep. 28, 2022

(65) Prior Publication Data

US 2024/0104438 A1 Mar. 28, 2024

(51) Int. Cl.

| | |
|---|---|
| ***G06N 20/20*** | (2019.01) |
| ***G06F 18/21*** | (2023.01) |
| ***G06F 18/214*** | (2023.01) |
| ***G06N 3/098*** | (2023.01) |

(52) U.S. Cl.

CPC ........... *G06N 20/20* (2019.01); *G06F 18/214* (2023.01); *G06F 18/217* (2023.01); *G06N 3/098* (2023.01)

(58) Field of Classification Search

CPC ........ G06N 3/098; G06N 20/00; G06N 20/20; G06F 18/217; G06F 18/214

See application file for complete search history.

(56) References Cited

U.S. PATENT DOCUMENTS

| | | | | |
|---|---|---|---|---|
| 7,827,123 | B1 * | 11/2010 | Yagnik | G06N 20/00 706/12 |
| 2007/0112824 | A1 * | 5/2007 | Lock | G06F 11/0754 707/999.102 |
| 2017/0109322 | A1 * | 4/2017 | McMahan | G06N 20/00 |

(Continued)

OTHER PUBLICATIONS

Han et al., “Demystifying Swarm Learning: A New Paradigm of Blockchain-based Decentralized Federated Learning”, Jan. 17, 2022, 20 pages.

(Continued)

*Primary Examiner* — Tamara T Kyle
*Assistant Examiner* — William Wong
(74) *Attorney, Agent, or Firm* — Sheppard Mullin Richter Hampton LLP

(57) ABSTRACT

Systems and methods for checking whether training data to be inputted into a training phase of a ML model is Independent and Identically Distributed data (IID data), and taking action based on that determination. One example of the present disclosure provides a method implemented by an edge node operating in a distributed swarm learning blockchain network. The method includes receiving a smart contract including a definition of conforming data and executing the smart contract including the definition of conforming data. The method further includes receiving one or more batches of training data for training a ML model. The method further includes checking whether each batch of training data conforms to the agreed-upon definition of conforming data, tagging and isolating non-conforming batches of training data, and inputting conforming batches of training data into a training phase of the machine learning model. The conforming batches of training data are IID data.

20 Claims, 7 Drawing Sheets

(56) References Cited

U.S. PATENT DOCUMENTS

| | | | | |
|---|---|---|---|---|
| 2019/0228338 | A1* | 7/2019 | Chapman | G06N 7/01 |
| 2020/0329062 | A1* | 10/2020 | Beauchesne | H04L 63/08 |
| 2021/0234668 | A1* | 7/2021 | Manamohan | H04L 9/3239 |
| 2022/0121989 | A1* | 4/2022 | Shishido | G06F 18/217 |
| 2022/0284064 | A1* | 9/2022 | Shaw | G06F 40/232 |
| 2023/0090731 | A1* | 3/2023 | Kang | G06F 21/6245 706/12 |

OTHER PUBLICATIONS

Li et al., "Federated Learning on Non-IID Data Silos: An Experimental Study", Oct. 28, 2021, 20 pages.

Zhu et al., "Federated Learning on Non-IID Data: A Survey", Jun. 12, 2021, 29 pages.

* cited by examiner

SWARM LEARNING, PRIVACY PRESERVING, DE-CENTRALIZED IID DRIFT CONTROL

BACKGROUND

Machine learning (ML) generally involves a computer-implemented process that builds a model using sample data (e.g., training data) in order to make predictions or decisions without being explicitly programmed to do so. ML processes are used in a wide variety of applications, particularly where it is difficult or unfeasible to develop conventional algorithms to perform various computing tasks.

Blockchain is a tamper-proof, decentralized ledger that establishes a level of trust for the exchange of value without the use of intermediaries. A blockchain can be used to record and provide proof of any transaction, and is updated every time a transaction occurs.

A particular type of ML process, called supervised machine learning, uses labeled datasets to train algorithms to classify data or predict outcomes. The process for setting up the supervised machine learning generally involves (a) centralizing a large data repository, (b) acquiring a ground truth for these data, i.e., the reality or correct answer that is being modeled with the supervised machine learning algorithm, and (c) employing the ground truth to train the ML model for the classification task. However, this framework poses significant practical challenges, including data privacy and security challenges that come with creating a large central data repository for training the ML models.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
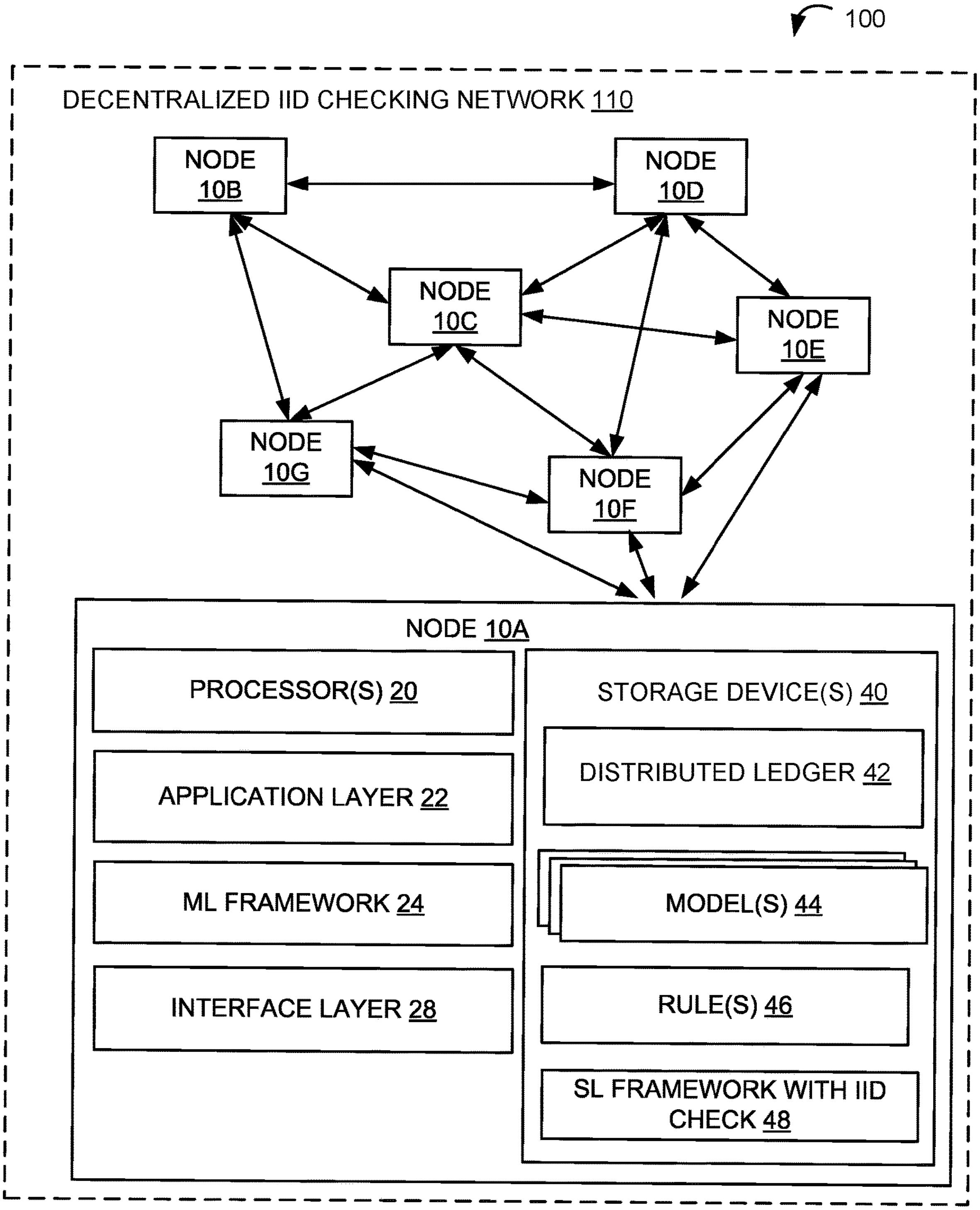
FIG. 1 illustrates an example system of a decentralized IID checking network using blockchain, according to an example implementation of the disclosure.

The figures are not exhaustive and do not limit the present disclosure to the precise form disclosed.

DETAILED DESCRIPTION

Federated learning or collaborative learning is a type of ML process that trains an ML model across multiple decentralized devices holding local data samples. In some examples, the decentralized devices may not exchange their data sets. This approach stands in contrast to traditional centralized ML techniques where all local datasets are uploaded to one server, as well as in contrast to more classical decentralized approaches which often assume that local data samples are identically distributed. Particularly, federated learning enables multiple devices to build a common, robust ML model without sharing data, thus allowing to address critical issues such as data privacy, data security, data access rights, and access to heterogeneous data. Its applications are spread over a number of industries including but not limited to defense, telecommunications, Internet of Things (IoT), and pharmaceutics.

However, privacy concerns remain in federated learning. For example, the sources that provide data for federated learning may be unreliable. The sources may be vulnerable to network issues since they commonly rely on less powerful communication media (i.e., Wi-Fi®) or battery-powered systems (i.e., smartphones and IoT devices) compared to traditional centralized ML where nodes are typically data centers that have powerful computational capabilities and are connected to one another with fast networks.

Distributed or decentralized ML can refer to ML model building across multiple nodes using data locally available to each of the nodes. The local model parameters learned from each local model can be merged to derive a global model, where the resulting global model can be redistributed to all the nodes for another iteration, i.e., localized data trains the global model. This can be repeated until the desired level of accuracy with the global model is achieved.

Model training in general involves separating available data into training datasets and validation datasets, where after running a training iteration using the training dataset, a model can be evaluated on its performance/accuracy by performing on data it has never seen, i.e., the validation dataset. The degree of error or loss resulting from this evaluation is referred to as validation loss. Validation loss can be an important aspect of ML for implementing training features. For example, validation loss can be used to avoid overfitting a model on training data by creating an early stopping criterion in which training is halted once the validation loss reaches a minimum value. As another example, validation loss can be used in an adaptive synchronization setting, where the length of a synchronization interval is modulated based on the progress of validation loss values across multiple iterations (i.e., modulating the synchronization frequency).

However, in a distributed ML environment, where data is not maintained in a central/single location, validation is not possible at any single participating node during training. Thus the model at any single participating node cannot be evaluated as to its accuracy during training.

Therefore, according to some embodiments, prior to each training iteration, respective local datasets at each participating node are divided into training datasets and validation datasets. Then, a local training iteration commences in batches using the training datasets. At the end of each training batch, a node is designated as a merge leader for that batch. The merge leader merges the parameters from each of the participating nodes (including itself) to build a global model. The merged parameters then can be shared with the rest of the participating nodes. The merged parameters are subsequently applied to each local model at each of the participating nodes. The updated local models are then evaluated using the previously identified validation datasets. Each participating node then shares its respective local validation loss value with the leader. The merge leader merges or averages the local validation loss values to arrive at a global validation loss value, which can then be shared with the rest of the nodes. Accordingly, a global validation loss value can be derived based on the universe of participating nodes, and this global validation loss value can be used by each of the participating nodes to determine if training can stop or if further training may be needed.

This parameter merging process can be repeated until the network is able to converge the global model to a desired accuracy level. As part of determining whether the global model is able to achieve a desired accuracy level, the validation loss may be calculated. As discussed above, validation may be performed locally, the local validation loss of each node can be shared, and an average of the local validation loss can be calculated to derive a global validation loss. This global validation loss may be shared with each node so that each node may determine how well its local model has performed or has been trained from a network or system-wide (i.e., global) perspective.

In particular, upon determining that a quorum of nodes in a swarm learning network are ready to merge their respective model parameters, a merge leader is elected. In Swarm Learning (SL) each node possessing local training data trains a common ML model without sharing the local training data to any other node or entity in the swarm blockchain network. This is accomplished by sharing parameters (weights) derived from training the common ML model using the local training data. In this way, the learned insights regarding raw data (instead of the raw data itself) can be shared amongst participants or collaborating peers/nodes, which aids in protecting data against privacy breaches. Moreover, Swarm Learning as described herein leverages blockchain technology to allow for decentralized control, monetization, and ensuring trust and security amongst individual nodes. Additional information describing Swarm Learning is described in greater detail in U.S. patent application Ser. No. 17/205,632 filed on Mar. 18, 2021 and published as U.S. Patent Application Publication No. US 2021/0398017, the contents of which are incorporated by reference herein.

The assumption of "independent and identically distributed data" (IID data) is common in Machine Learning algorithms. "Independent" means that samples taken from individual random variables are independent of each other. A distribution is "identical" if the samples come from the same random variable.

As industry demand trends towards Swarm Learning and Decentralized Learning as well as Federated Learning, various technical problems arise. How to deal with a technical problem operationally is a significant issue. As referred to above, it is a common technology assumption that many techniques work well provided the data honors IID. For example, in a Decentralized Learning context such as Swarm Learning, there is a significant assumption made about the training data that is fed into the training phase, specifically, that such data is IID. However in conventional techniques the burden lies on the customer to ensure that the data is IID.

Accordingly a technical problem with conventional techniques is that there is no provision to detect IID—or non-IID—within Machine Learning systems such as Swarm Learning. Without such provision it can be difficult for a distributed customer to ensure that the data fed into the training phase is IID. This can lead to spurious weights being exchanged in the batches of training, which can adversely affect the learning. Spurious weights in one example are parameters that do not conform to IID and therefore can lower the trustworthiness of the model.

In more detail, when the IID assumption of a system does not hold, data drift can result, thereby causing issues such as the ML algorithms in the system becoming less trustworthy, with less reliable data used in distributed trainings. For example, a drift can occur on input data streams or predicted output data, or a concept shift can occur in a relationship between input data streams and outputs, over a period of time. In another example drift might be due to bias in the data collection phase. In any event non-IID data can cause drift.

Accordingly IID requirements of data if not met can alter the model output and can be a leakage which can affect certain global assumptions of decentralized models. One example of a global assumption of decentralized models may be that the data input into the training phase at edge nodes is IID data. Training a network behavior model from a different node, without each node abiding by an agreement of IID data for training data, can cause less reliable or less trustworthy model outputs to be exchanged.

The present disclosure provides technical solutions that address the above technical problems. For example, in a Swarm Learning framework the disclosed technology provides a data consistency check or an explicit data configuration check in the SL framework, as a configuration exchanged before the training phase. This can isolate data batches that do not conform to the expected IID norm and thereby keep these non-conforming data batches away from training. The isolated data can be used later for data science admin introspection, in which a human or data admin analyzes the isolated data, and may even later correct the non-conforming data and place the corrected back into the pipeline for IID checking, or include the corrected data in the training set as qualified IID data. Data isolation logs and data sheets can be kept. Accordingly the disclosure uses decentralized configuration checks to conform to Global IID requirements. Human Introspection for example might include statistical analysis or data analysis to investigate how the data ended up as non-conforming in the first place. For example, this inquiry might look into whether there were any data entry errors, or measurement errors by sensors, etc. After the non-conforming data has been suitably treated by making any needed corrections, the admin can plan to re-include the data for training batches.

Swarm Learning has an enterprise enablement framework with licensing and control for nodes joining for privacy preserving Decentralized Learning. Examples of the disclosed technology provide localized IID drift detection capability before the training stage. This can be achieved in multiple ways. One non-limiting example is for structured data. Structured data can be measured such as being bounded within the Min/Max of a univariate variable or even checking the integrity of multivariate variables by checking the correlation or covariance shifts. Another non-limiting example is for unstructured data such as images: it may be difficult or quite complex to filter the image at the source. In such cases according to the disclosed technology there can be knobs or levers of control provided for aspects such as batch training times, layer weights, etc., which may be indicators of IID data.

These additional steps can make ML algorithms more conforming and with more reliable data used in distributed trainings. By virtue of the technical solutions described herein, IID conformance can be increased, which can increase data trustworthiness, particularly when using SL. This can have technical effects such as increasing control, monitoring, and visibility of ML algorithms which can result in more adoption and trustworthiness. IID requirements of data can be met which can reduce alteration of the model output and reduce the leakage that can affect the global assumption of decentralized models. Model output trustworthiness can be increased via explicit IID data conformance and configuration.

As an example, consider a system that uses one or more machine learning models, in which system behavior is used to model the system reliability, degradation, availability, conformance, policy, etc. For example, a robotics system can exchange monitoring parameters operating within set IID thresholds, and detected non-IID conformance can flag an anomaly and then take action to isolate the non-conforming data or pause the system, etc. In the case of a network where non-conforming IID data is detected, the network can then be isolated based on the analyzed system behavior. The present disclosure is of course not limited to these examples.

The present disclosure according to an example provides an edge node operating in a distributed swarm learning blockchain network. The edge node comprises at least one processor and a memory unit operatively connected to the at least one processor. The memory unit includes instructions that, when executed, cause the at least one processor to receive a smart contract including a definition of conforming data and execute the smart contract including the definition of conforming data, to thereby agree upon the definition of conforming data set out in the smart contract. The instructions further cause the at least one processor to receive one or more batches of training data for training a machine learning model. The instructions further cause the at least one processor to check whether each batch of training data conforms to the agreed-upon definition of conforming data, to determine conforming batches of training data and non-conforming batches of training data, tag and isolate the non-conforming batches of training data, and input the conforming batches of training data into a training phase of the machine learning model. The conforming batches of training data are IID data. The non-conforming batches of training data may be listed in a log, or may be discarded. The trained weights or parameters may be shared with the network; more particularly, the memory unit may include instructions that when executed further cause the at least one processor to share with other nodes in the network trained weights or parameters derived from training the local version of the machine learning model using the conforming batches of training data.

As noted above, the disclosed technology may be applied at participant nodes under control of a blockchain network such as a Swarm Learning network. These nodes can be referred to as "edge" systems as they may be placed at or near the boundary where the real world (e.g., user computing devices, IoT devices, or other user-accessible network devices) interacts with large information technology infrastructure. For example, autonomous ground vehicles currently include more than one computing device that can communicate with fixed server assets. More broadly, edge devices such as IoT devices in various context such as consumer electronics, appliances, or drones, are increasingly equipped with computational and network capacity. Another example includes real-time traffic management in smart cities, which divert their data to a data center. However, as described herein, these edge devices may be decentralized for efficiency and scale to perform collaborative machine learning as nodes in a blockchain network.

FIG. 1 illustrates an example system of decentralized IID checking network using blockchain, according to an example implementation of the disclosure. Illustrative system 100 comprises decentralized IID checking network 110 with a plurality of nodes 10 in a cluster or group of nodes at a location (illustrated as first node 10A, second node 10B, third node 10C, fourth node 10D, fifth node 10E, sixth node 10F, seventh node 10G). The decentralized IID checking network 110 may be a Swarm Learning network.

The plurality of nodes 10 in the cluster in decentralized IID checking network 110 (also referred to as a blockchain network 110) may comprise any number, configuration, and connections between nodes 10. As such, the arrangement of nodes 10 shown in FIG. 1 is for illustrative purposes only. Node 10 may be a fixed or mobile device. Examples of further details of node 10 will now be described. While only one of nodes 10 is illustrated in detail in the figures, each of nodes 10 may be configured in the manner illustrated. Node 10 may include one or more processors 20 (interchangeably referred to herein as processors 20, processor(s) 20, or processor 20 for convenience), one or more storage devices 40, or other components.

Distributed ledger 42 may include a series of blocks of data that reference at least another block, such as a previous block. In this manner, the blocks of data may be chained together as distributed ledger 42. For example, in a distributed currency context, a plurality of exchanges may exist to transfer a user's currency into a digital or virtual currency. Once the digital or virtual currency is assigned to a digital wallet of a first user, the first user may transfer the value of the digital or virtual currency to a digital wallet of a second user in exchange for goods or services. The digital or virtual currency network may be secured by edge devices or servers (e.g., miners) that are rewarded new digital or virtual currency for verifying this and other transactions occurring on the network. After verification, the transaction from the digital wallet of the first user to the digital wallet of the second user may be recorded in distributed ledger 42, where a portion of distributed ledger 42 may be stored on each of the edge devices or servers.

In some implementations, distributed ledger 42 may provide a blockchain with a built-in fully fledged Turing-complete programming language that can be used to create "contracts" that can be used to encode arbitrary state transition functions. Distributed ledger 42 may correspond with a protocol for building decentralized applications using an abstract foundational layer. The abstract foundational layer may include a blockchain with a built-in Turing-complete programming language, allowing various decentralized systems to write smart contracts and decentralized applications that can communicate with other decentralized systems via the platform. Each system can create its own arbitrary rules for ownership, transaction formats, and state transition functions. Smart contracts or blocks can contain one or more values (e.g., state) and be encrypted until they are unlocked by meeting conditions of the system's protocol.

Distributed ledger 42 may store the blocks that indicate a state of node 10 relating to its machine learning during an iteration. Thus, distributed ledger 42 may store an immutable record of the state transitions of node 10. In this manner, distributed ledger 42 may store a current and historic state of model in model data store 44.

Model data store 44 may be memory storage (e.g., data store) for storing locally trained ML models at node 10 based on locally accessible data, as described herein, and then updated based on model parameters learned at other participant nodes 10. As noted elsewhere herein, the nature of model data store 44 will be based on the particular implementation of the node 10 itself. For instance, model data store 44 may include trained parameters relating: to self-driving vehicle features such as sensor information as it relates object detection, dryer appliance relating to drying times and controls, network configuration features for network configurations, security features relating to network security such as intrusion detection, and/or other context-based models.

ML algorithms stored in model store 44 include the general class of ML algorithms that operate on IID. That includes many statistical and classical ML algorithms in use by verticals, such as regression-based, Decision Tree (DT), Support Vector Machine (SVM), etc. Training methods can include, but are not limited to, standard batch training.

Rules 46 may include smart contracts or computer-readable rules that configure nodes to behave in certain ways in relation to decentralized machine learning and enable decentralized control. For example, rules 46 may specify deterministic state transitions, when and how to elect a voted leader node, when to initiate an iteration of machine learning, whether to permit a node to enroll in an iteration, a number of nodes required to agree to a consensus decision, a percentage of voting participant nodes required to agree to a consensus decision, and/or other actions that node 10 may take for decentralized machine learning.

SL framework with IID check 48 is a Swarm Learning framework, platform, architecture, application, or the like. The SL framework 48 will be further described below in connection with FIG. 2B. The SL framework 48 can be downloaded and installed on the respective nodes 10 during which the configuration of the network 110, finalized during an initialization and onboarding step as further described below, is also supplied. Afterwards, the SL framework 48 boots up and initiates the connection of a node 10 to the network 110, which is essentially a blockchain overlay on the underlying network connection between the nodes 10. The boot-up process is an ordered process in which the set of participant nodes 10 designated as peer-discover nodes 10 (during the initialization phase) are booted up first, followed by the rest of the nodes 10 in the network.

In general a smart contract is a program stored on a blockchain that contains a set of rules by which the parties or participants to the smart contract agree to interact with each other. The program runs when predetermined condition (s) are met. Accordingly, smart contracts are typically used to automate the execution of an agreement so that all participants can be immediately certain of the outcome or the predetermined condition(s), without any intermediary's involvement or time loss. Smart contracts can also automate a workflow, triggering the next action when conditions are met. In examples of the disclosed technology a smart contract can include a definition of conforming data, e.g., IID data that all participating nodes agree to, as described in more detail herein.

As will be described in more detail below in connection with FIG. 2B, the SL framework 48 may be implemented by swarm learning architecture 230 which includes an IID configuration file 232 and an IID check engine 238. These structural elements in the SL framework 48 facilitate rules or smart contracts that define a definition of conforming data, e.g., IID data, that may be stored in the distributed ledger 42 or the rules 46 of FIG. 1. The SL framework 48 may require nodes 10 to agree with the rules or definitions of conforming data, e.g., IID data, in order to be connected to the network 110 or treated as a participating node 10. If a node 10 fails to execute the smart contract agreeing to the definition of IID then that node cannot join the decentralized training. The SL framework 48 may also require participating nodes 10 to check for conforming data, e.g., IID data, before such data is inputted into the training phase of a ML model stored for example in model store 44, as described further below in connection with FIG. 2A.

Accordingly, examples of the disclosed technology provide a data consistency check or an explicit data configuration check in the SL framework, as a configuration exchanged before the training phase. This check can isolate data batches that do not conform to the expected IID norm, meaning that these non-conforming data batches are kept away from training and may be recorded in a data log. Thus in examples the disclosure uses decentralized configuration checks, to conform to Global IID requirements.

Processors 20 may obtain other data accessible locally to node 10 but not necessarily accessible to other nodes 10. Such locally accessible data may include, for example, private data that should not be shared with other devices, but model parameters that are learned from the private data can be shared. Processors 20 may be programmed by one or more computer program instructions. For example, processors 20 may be programmed to execute application layer 22, machine learning framework 24 (illustrated and also referred to as ML framework 24), interface layer 28, or other instructions to perform various operations, each of which are described in greater detail herein. As used herein, for convenience, the various instructions will be described as performing an operation, when, in fact, the various instructions program processors 20 (and therefore node 10) to perform the operation.

Application layer 22 may execute applications on the node 10. For instance, application layer 22 may include a blockchain agent (not illustrated) that programs node 10 to participate in a decentralized machine learning across blockchain network 110 as described herein. In examples each node 10 may be programmed with the same blockchain agent, thereby ensuring that each acts according to the same set of decentralized IID checking rules, such as those which may be encoded using rules 46. For example, the blockchain agent may program each node 10 to perform IID checking using an agreed-upon definition of IID data as set out in an executed smart contract according to the process further described below in connection with FIG. 2A. Application layer 22 may execute machine learning through the ML framework 24.

ML framework 24 may train a model based on data accessible locally at node 10. This data may undergo IID checking in accordance with the disclosed technology. For example, ML framework 24 may generate model parameters from sensor data, data aggregated from nodes 10 or other sources, data that is licensed for sources, and/or other devices or data sources to which the node 10 has access. The data may include private data that is owned by the particular node 10 and not visible to other devices. In an implementation, the ML framework 24 may use the TensorFlow™ machine learning framework, although other frameworks may be used as well.

Application layer 22 may use interface layer 28 to interact with and participate in the blockchain network 110 for decentralized machine learning across multiple participant nodes 10. Interface layer 28 may communicate with other nodes using blockchain by, for example, broadcasting blockchain transactions and writing blocks to the distributed ledger 42 based on those transactions. Application layer 22 may use the distributed ledger 42 to coordinate parallel IID agreement and checking during an iteration with other participant nodes 10 in accordance with rules 46.

Interface layer 28 may share the one or more parameters and inferences with the other participant nodes 10. Interface layer 28 may include a messaging interface used to communicate via a network with other participant nodes 10. The messaging interface may be configured as a Secure Hypertext Transmission Protocol ("HTTPS") micro server. Other types of messaging interfaces may be used as well. Interface layer 28 may use a blockchain API to make calls for blockchain functions based on a blockchain specification. Examples of blockchain functions include, but are not limited to, reading and writing blockchain transactions and reading and writing blockchain blocks to the distributed ledger 42.

As noted above, the network 110 can be a network such as a Swarm Learning network. Swarm Learning can involve various stages or phases of operation including, but not limited to: initialization and onboarding; installation and configuration; and integration and training. Initialization and onboarding can refer to a process (that can be an offline process) that involves multiple entities interested in swarm-based ML to come together and formulate the operational and legal requirements of the decentralized system. This includes aspects such as but not limited to data (parameter) sharing agreements, arrangements to ensure node visibility across organizational boundaries of the entities, a consensus on the expected outcomes from the model training process. Values of configurable parameters provided by a Swarm Learning network, such as the peer-discovery nodes supplied during boot up and the synchronization frequency among nodes, are also finalized at this stage. Moreover, the common (global) model to be trained and the reward system (if applicable) can be agreed upon.

As noted above, once the initialization and onboarding phase is complete, all nodes 10 of FIG. 1 may download and install the Swarm Learning framework 48 onto their respective machines. The Swarm Learning framework 48 may then boot up, and each node's connection to the swarm learning/swarm-based blockchain network can be initiated. As used herein, the term Swarm Learning framework 48 can refer to a blockchain overlay on an underlying network of connections between nodes 10. The boot up process can be an ordered process in which the set of nodes designated as peer-discovery nodes (during the initialization phase) are booted up first, followed by the rest of the nodes 10 in the Swarm Learning network 110.

With regard to the integration and training phase, the Swarm Learning framework 48 can provide a set of APIs that enable fast integration with multiple frameworks. These APIs can be incorporated into an existing code base for the Swarm Learning framework 48 to quickly transform a stand-alone ML node into a swarm learning participant. It should be understood that participant and node may be used interchangeably in describing various examples.

Figure 2A:
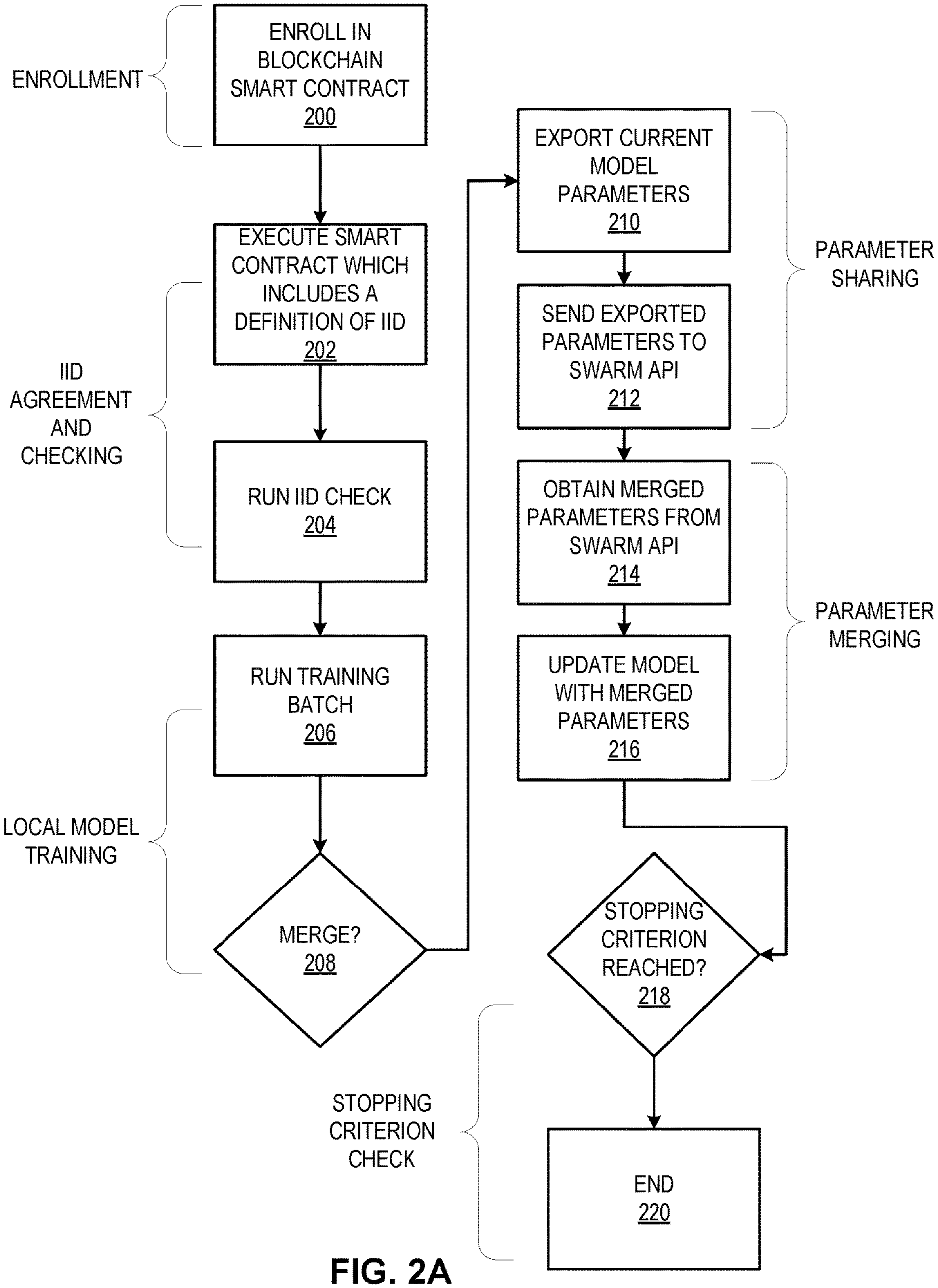
FIG. 2A illustrates example stages and operational flow of swarm learning including IID agreement and checking in accordance with an example of the disclosed technology.

At a high level, model training in accordance with various examples may be described in terms of enrollment, IID agreement, IID checking, local model training, parameter sharing, parameter merging, and stopping criterion check. FIG. 2A illustrates operations that can be performed by the Swarm Learning framework 48 embodied by, e.g., SL architecture 230 in accordance with an example of the disclosed technology.

At 200, enrollment occurs. That is, each node 10 in the Swarm Learning network 110 may enroll or register itself in a swarm learning contract or smart contract. This means that each node 10 may execute a swarm learning contract or smart contract. In one example, this can be a one-time process. In other examples, enrollment or registration may be performed after some time as a type of verification process. Each node 10 can subsequently record its relevant attributes in the swarm learning or smart contract, e.g., the uniform resource locator (URL) from which its own set of trained parameters can be downloaded by other nodes.

At 202, an IID agreement occurs. That is, each participating node 10 in the swarm learning network 110 may execute a smart contract that includes a definition of conforming data, e.g., a definition of IID data. Executing a smart contract means that each participating node 10 may enroll in or agree to a smart contract that includes a definition of conforming data. In this way each participating node 10 that has executed a smart contract having a definition of conforming data has agreed to the definition of conforming data. Conforming data refers to data that is in compliance with a definition or set of rules or criteria. Such rules or criteria could be, for example, IID or others. Indicia of conforming data may comprise markers or factors that alone or together tend to indicate whether data is conforming data. A definition of conforming data refers to how conforming data is defined in the smart contract. In the example of FIGS. 2A and 2B conforming data is IID data but conforming data is not necessarily limited to IID data. In other examples Steps 202 and 204 of FIG. 2A are conforming data agreeing and checking steps in which (Step 202) a smart contract that is executed by a participating node 10 may include a definition of conforming data and (Step 204) a conforming data check is run.

The definition of conforming data may be formed or provided by a data scientist, for example. This definition is subsequently used in examples of the disclosed technology to determine whether potential training data qualifies as conforming data, e.g., IID data, to be used in one or more ML models 44. Accordingly at 202 a participating node 10 executes a smart contract that includes a definition of conforming data, e.g., IID data, in order to agree to the definition. The definition of IID may be a set definition as described. In examples it enables a conformance check and is given as an input that is configurable by a human operator or data science admin. It can be a simple rule or use an algorithm output to have as a bound check. Notably the definition of IID removes ambiguity around unknown or unexpected data properties. The IID agreement and checking provides a conformance check to filter out non-IID data. The definition of IID may include various IID criteria, or measures to be performed to implement IID conformance (e.g., "all values of X falling in a range from A to B is IID"). A histogram could be used as a filter to perform IID checking.

At 204, an IID check occurs. More specifically, data from a potential training set or batch is checked against the definition of conforming data agreed to in 202. Conforming data can be for example IID data. Accordingly the SL framework 48 may require participating nodes 10 to agree with the rules or definitions of conforming data, e.g., IID data, in order for that data to be used during an upcoming training phase.

An IID check in 202 can occur in various ways. As noted above one non-limiting example is for structured data. Structured data can be measured such as being bounded within the Min/Max of a univariate variable or even checking the integrity of multivariate variables by checking the correlation or covariance shifts. Another non-limiting example is for unstructured data such as images; it may be difficult or quite complex to filter the image at source. In such cases according to the disclosed technology there can be knobs or controls provided for aspects like batch training times, layer weights, etc., which might be indicators of IID data. As an example, if the training data includes height and weight of a person, then IID data might be a minimum height of 6 feet and a minimum weight of 200 pounds.

Accordingly, the IID check of 204 can check whether each set of training data conforms to the definition of conforming data agreed upon in 202. The IID check 204 can also include marking/tagging and isolating non-conforming sets of training data, and inputting conforming sets of training data into a training phase of the machine learning model, as described in more detail below in connection with FIGS. 3 and 5. The non-conforming sets or batches or portions of batches of training data may be listed in a log, or may be discarded. (It is noted that in this disclosure "set" of training data and "batch" of training data are being used interchangeably.)

Therefore the disclosed technology in examples provides a data consistency check or an explicit data configuration check in the SL framework 48, as a configuration exchanged before the training phase. This can isolate data batches that do not conform to the expected IID norm and thereby keep these non-conforming data batches away from training. Thus the disclosed technology uses decentralized configuration checks to conform to Global IID requirements.

At 206, local model training occurs, where each node proceeds to train a local copy of the global or common model in an iterative fashion over multiple rounds that can be referred to as epochs. Due to the IID agreement at 202 and the IID checking at 204, the training done at 206 can be done with training datasets that satisfy the definition of IID data as agreed to in a smart contract during the IID agreement 202. Training data may include, but is not limited to, numerical data.

During each epoch, each node 10 trains its local model using one or more data batches for some given number of iterations. The data batches to be used in the training are data batches that have passed the IID check at 204 using the agreed-upon IID definition at 202. A further check to determine if parameters can be merged may be performed at 208. That check can determine if the threshold number of iterations has been reached and/or whether a threshold number of participating nodes 10 are ready to share their respective parameters. These thresholds can be specified during the initialization phase. After the threshold number of iterations has been reached, the parameter values of each node 10 are exported to a file, which can then be uploaded to a shared file system for other nodes 10 to access. Each node 10 may signal the other nodes 10 that it is ready to share its parameters.

Once parameter sharing commences, current model parameters may be exported at 210 and the exported parameters can be sent to a swarm learning application programming interface (API) (described in greater detail below) at 212. The parameter sharing phase can begin with the election of a merge or epoch leader, whose role is to merge the parameters derived after local training on the common model at each of the nodes. This election of a merge or epoch leader can occur after each epoch. While it is possible to elect a node 10 to act as the merge leader across multiple epochs, electing a merge leader after each epoch helps ensure privacy by changing which node 10 has the public key. Upon selection of one of the nodes 10 of the Swarm Learning network 110 to be the merge leader, the URL information of each participant or node 10 can be used to download the parameter files from each node 10. In one example, a star topology can be used, where a single merge leader performs the merge. Other topologies, such as a k-way merge, where the merge is carried out by a set of nodes 10, may also be used.

The merge leader may then merge the downloaded parameter files (from each swarm learning network node 10). Appropriate merge mechanisms or algorithms may be used, e.g., one or more of mean merging, weighted mean merging, median merging, etc. The merge leader may combine the parameter values from all of the nodes 10 to create a new file with the merged parameters, and signals to the other nodes 10 that a new file is available. At 214, each node 10 may obtain the merged parameters (represented in the new file) from the merge leader via the swarm API. At 216, each node 10 may update its local version of the common model with the merged parameters. By virtue of the features of the disclosed technology including the IID agreeing and checking, a situation in which spurious weights are exchanged in the batches of training due to non-IID data being included in training sets, which can adversely affect the learning, can be avoided.

At 218, a check can be performed to determine if a stopping criterion has been reached. That is, each of the nodes 10 evaluate the model with the updated parameter values using their local data to calculate various validation metrics. The values obtained from this operation are shared using a smart contract state variable. As each node completes this step, it signals to the Swarm Learning network 110 that the update and validation step is complete. In the interim, the merge leader may keep checking for an update complete signal from each node 10. When it discovers that all merge participants have signaled completion, the merge leader merges the local validation metric numbers to calculate global metric numbers. This updating of the model can be thought of as a synchronization step. If the policy decided during initialization supports monetization during model building, the rewards corresponding to the contributions by each of the participants are calculated and dispensed at this point. Afterwards, the current state of the Swarm Learning network 110 is compared against a stopping criterion, and if it is found to be met, the Swarm Learning process ends. Otherwise, the steps of local model training with IID data, parameter sharing, parameter merging, and stopping criterion check are repeated until the criterion is fulfilled.

Figure 2B:
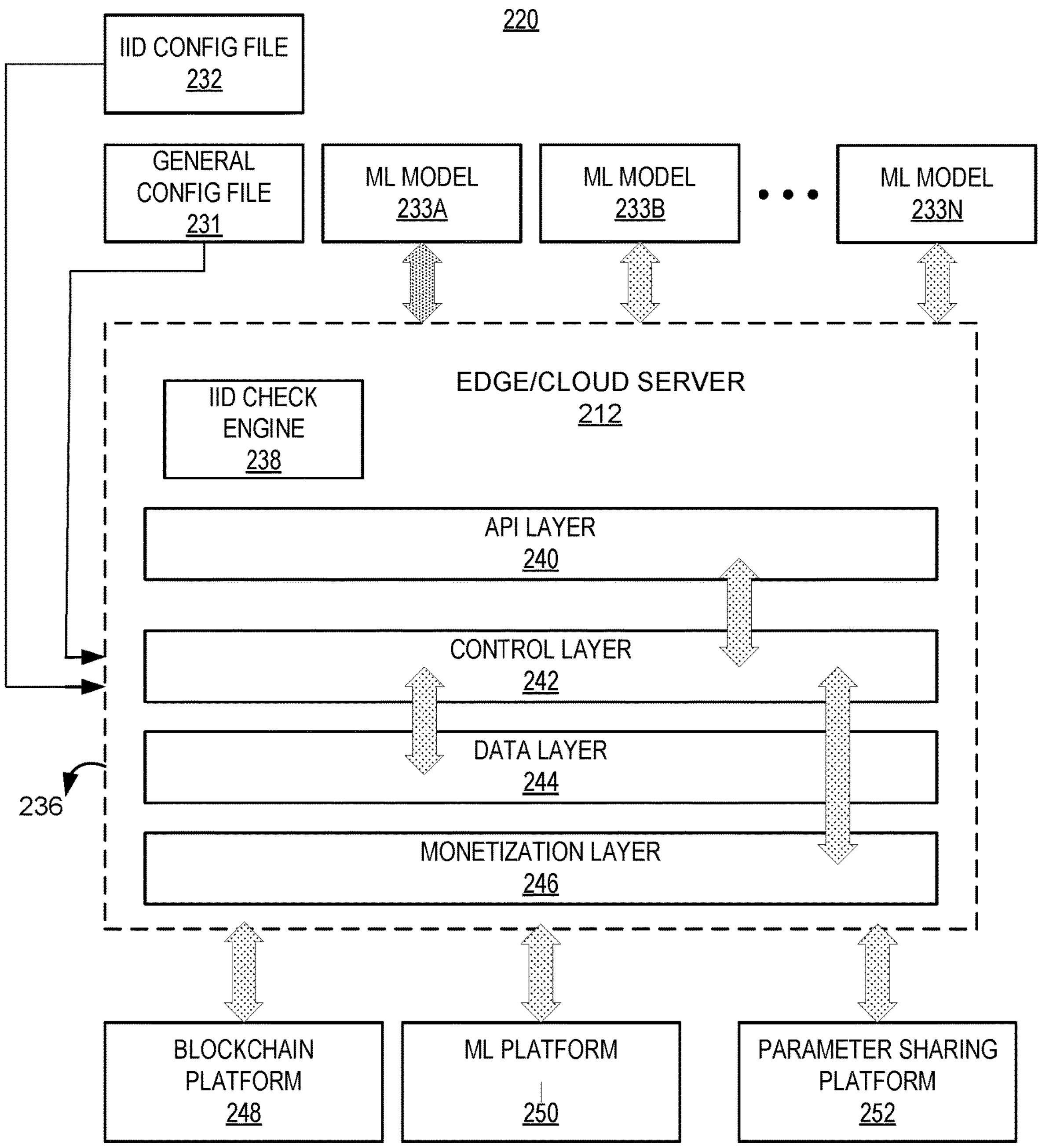
FIG. 2B illustrates an example swarm learning architecture implementing IID agreement and checking in accordance with an example of the disclosed technology.

FIG. 2B illustrates swarm learning architecture 230 in accordance with examples of the present disclosure. The swarm learning architecture 230 may be implemented by swarm learning framework 48 of FIG. 1. This swarm learning architecture 230 may include general configuration file 231, IID configuration file 232, and local ML models 233A, 233B, . . . , 233N at each node 10. These local ML models 233A-233N may be maintained and trained at nodes making up the swarm learning network 110, e.g., edge nodes 10, described above that make up blockchain network 110. The local ML models 233A-233N may also be stored in model store 44 of FIG. 1 and IID agreeing and checking as described herein may be performed on training data before the training data is inputted into ML models 233A-233N.

The swarm learning architecture 230 may include swarm learning component 236 which may include an IID check engine 238, an API layer 240, a control layer 242, a data layer 244, and a monetization layer 246. The swarm learning component 236 may operate (as noted above) in a blockchain context to ensure data privacy where a blockchain platform 248 operates on top of a ML platform 250 (that is distributed amongst nodes 10 of a swarm learning network). The sharing of parameters and validation loss values can be performed using a blockchain ledger 252, which may be an example of distributed ledger 42.

The general configuration file 231 enables configuration of normal parameters for SL. The IID configuration file 232 is a configuration exchange to aid in configuring SL components for IID agreement and checking. The IID configuration file stores various definitions of conforming data or various indicia of conforming data that may qualify data for being used as training data in an ML model 44. In the example of FIG. 2B conforming data is IID data but conforming data is not necessarily limited to IID data. Indicia of conforming data may comprise markers or factors that alone or together tend to indicate whether data is conforming data. The IID check engine 238 analyzes whether potential training datasets or batches of training data are conforming data, e.g., IID data. The IID check engine 238 can tag and isolate non-conforming sets of training data, and input conforming sets of training data into a training phase of the machine learning model. The non-conforming sets or batches of training data, which may be classified as malicious data, may be listed in a log, or may be discarded.

It should be noted that the components or elements of swarm learning architecture 230 can be modular so that the technologies used in implementing them can be replaced, adjusted, adapted, etc. based on requirements. The entire framework is designed to run on both commodity and high-end machines, supporting a heterogeneous set of infrastructure in the Swarm Learning network 110. It can be deployed within and across data centers, and has built-in support for a fault-tolerant network, where nodes 10 can exit and re-enter the Swarm Learning network 110 dynamically without derailing or stalling the model building process. In other words, blockchain platform 252 is used as an infrastructure component for implementing a swarm learning ledger (or blackboard) which can encompass the decentralized control logic for ML model building, key sharing, and parameter sharing logic. Edge nodes 10 (where ML models 233A, 233B . . . , 233N are trained) may themselves have all the infrastructure components and control logic used for controlling/managing swarm learning.

Swarm learning, in one example, can be implemented as an API library 240 available for multiple popular frameworks such as TensorFlow, Keras, and the like. These APIs provide an interface that is similar to the training APIs in the native frameworks familiar to data scientists. Calling these APIs automatically inserts the required "hooks" for swarm learning so that nodes 10 seamlessly exchange parameters at the end of each model training epoch, and subsequently continue the training after resetting the local models to the globally merged parameters.

Responsibility for keeping the Swarm Learning network 110 in a globally consistent state lies with the control layer 242, which is implemented using blockchain technology. The control layer 242 ensures that all operations and the corresponding state transitions are performed in an atomic manner. Both state and supported operations are encapsulated in a blockchain smart contract. The state comprises information such as the current epoch, the current members or participants of the Swarm Learning network 110, along with their IP addresses and ports, and the URIs for parameter files. The set of supported operations includes logic to elect a merge leader of the Swarm Learning network 110 toward the end of each epoch, fault-tolerance, and self-healing mechanisms, along with signaling among nodes for commencement and completion of various phases.

Data layer 244 controls the reliable and secure sharing of model parameters and validation loss values across the Swarm Learning network 110. Like control layer 242, data layer 244 is able to support different file-sharing mechanisms, such as hypertext transfer protocol secure (HTTPS) over transport layer security (TLS), interplanetary file system (IPFS), and so on. Data layer 244 may be controlled through the supported operations invoked by control layer 242, where information about this layer may also be maintained.

Figure 3:
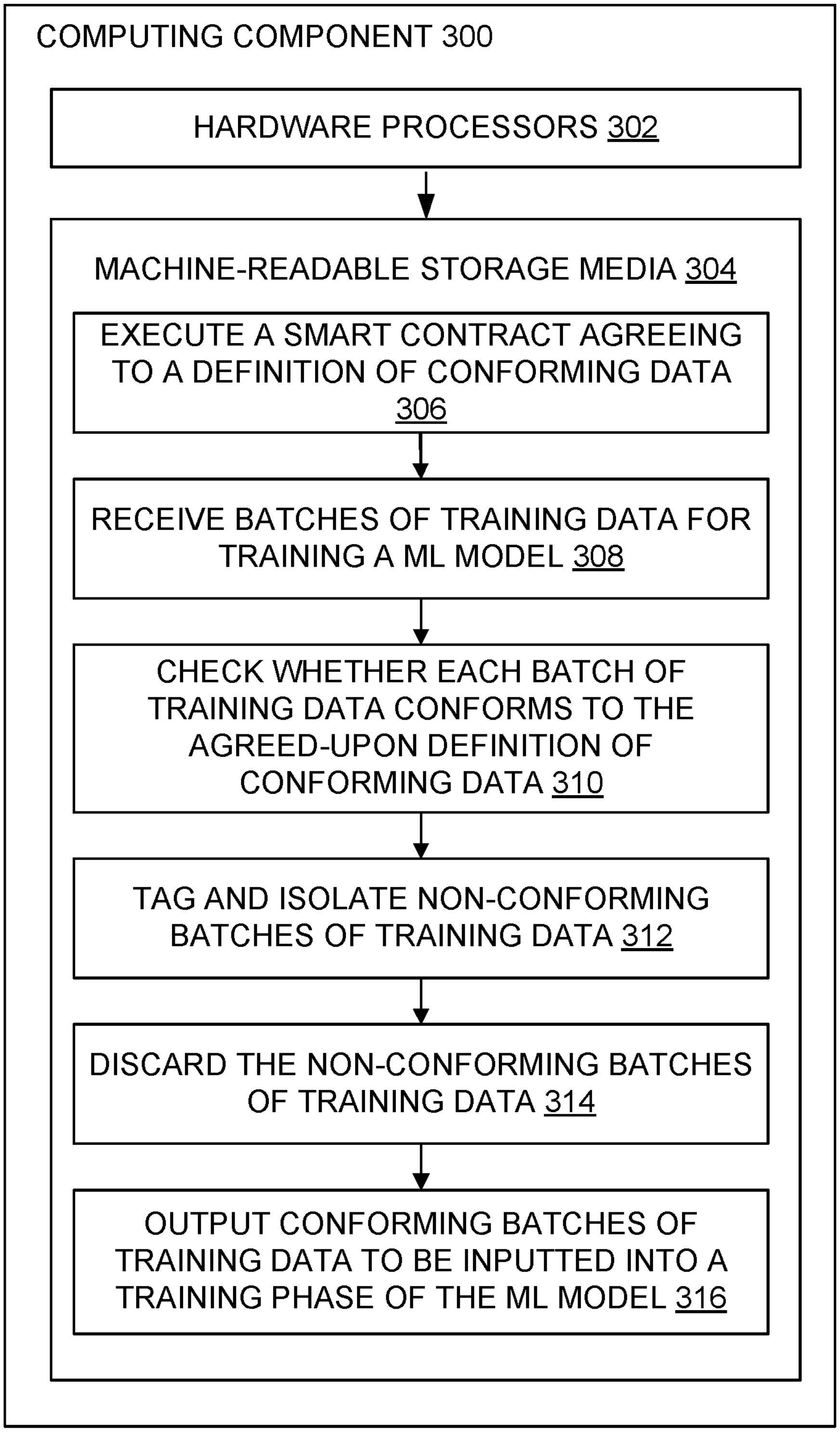
FIG. 3 is an example computing component that may be used to implement various IID agreement and checking functions of a node in accordance with one example of the disclosed technology.

FIG. 3 is an example computing component that may be used to implement various IID agreement and checking functions of a node in accordance with one example of the disclosed technology. Computing component 300 may be integrated in the SL framework 236 or may be separate from the SL framework 236 and may be, for example, a server computer, a controller, or any other similar computing component capable of processing data. In the example implementation of FIG. 3, the computing component 300 includes a hardware processor 302, and machine-readable storage medium 304. In some examples, computing component 300 may be an embodiment of processor 20 of node or edge node 10 (FIG. 1), and the node 10 may be operating in a distributed swarm learning blockchain network. In some examples, computing component 300 may be implemented, e.g., as the IID check engine 238 of FIG. 2B.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-316, to control processes or operations for agreeing to a definition of conforming data and checking whether data is conforming, in order to determine whether the data qualifies as training data for an ML model 44 or 233A-N. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-316.

Hardware processor 302 may execute instruction 306 to execute a smart contract that sets out a definition or criteria of conforming data based on the definition or criteria of IID stored in the IID configuration file 232. Accordingly, the node 10 agrees upon the definition of conforming data set out in the smart contract. By virtue of this agreement and smart contract process, IID conformance can be enforced. If the node 10 does not execute the smart contract then the node 10 may not participate in the parameter sharing of the SL network.

Hardware processor 302 may execute instruction 308 to receive sets or batches of training data for training a machine learning model 44 or 233A-N. Training data can be in various forms. One non-limiting example is structured data from different verticals such as IoT, System Monitoring, Clinical Data, Health, etc.

Hardware processor 302 may execute instruction 310 to check whether each set or batch of training data conforms to the agreed-upon definition or criteria of conforming data. The IID check can take on various forms. For example it can be a data consistency check or an explicit data configuration check as a configuration exchanged before the training phase. Therefore the network 110 is configured such that each node 10 can agree to the definition of IID data and perform the IID checking before the data is included as training data in an ML model 44 or 233A-N. One non-limiting example is for structured data. Structured data can be measured such as being bounded within the Min/Max of a univariate variable or even checking the integrity of multivariate variables by checking the correlation or covariance shifts. Another non-limiting example is for unstructured data such as images; it may be difficult or quite complex to filter the image at source. In such cases there can be knobs or controls provided for aspects like batch training times, layer weights, etc., which might be indicators of IID data.

Hardware processor 302 may execute instruction 312 to tag and isolate non-conforming sets or batches of training data. In this way non-conforming data, including either batches of data or portions of batches, can be tagged or marked and kept away from training. The isolated data can be kept in a log or on a data sheet. The non-conforming batches or sets of training data can be input into the check at a later time. Trained weights can be shared with the network, i.e., trained weights derived from training the local version of the machine learning model using the conforming batches of training data can be shared with other nodes in the network.

Hardware processor 302 may execute instruction 314 to discard the non-conforming batches of training data.

Hardware processor 302 may execute instruction 316 to output conforming sets of training data to be input into a training phase of the machine learning model 44 or 233A-N, wherein the conforming sets of training data are IID data. Accordingly the conforming batches or sets of training data can be used to train a local version of a ML model 44 or 233A-N at the training node. In distributed or decentralized ML networks, training of a ML model at, e.g., an edge node, may entail training an instance or version of a common, global model using training data at the edge node 10. The training data may be a training data subset of local data at the edge node 10.

Figure 4:
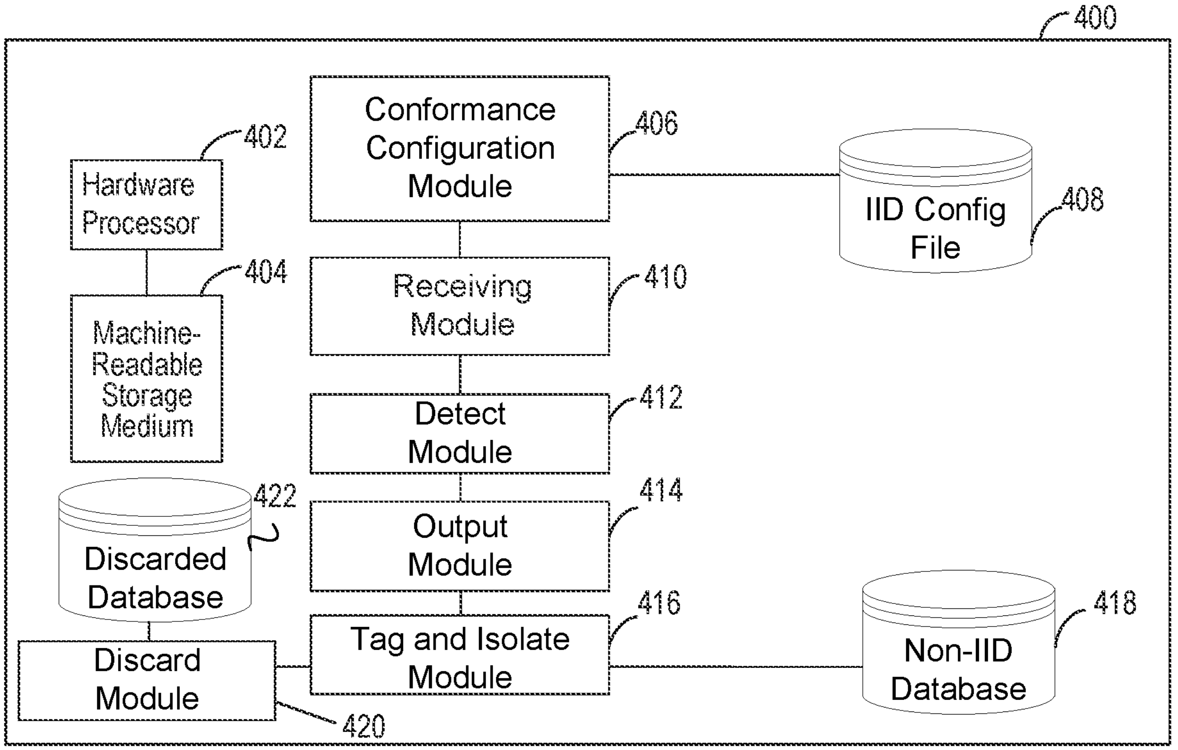
FIG. 4 is an example computing component that may be used to embody an IID check engine, in order to perform various IID agreement and checking functions of a node in accordance with an example of the disclosed technology.

FIG. 4 is an example computing component 400 that may be used to embody the IID check engine 238 of FIG. 2B, in order to perform various IID agreement and checking functions of a node 10 in accordance with an example of the disclosed technology. Computing component 400 may be integrated in the SL framework 236 or may be separate from the SL framework 236 and may be, for example, a server computer, a controller, or any other similar computing component capable of processing data. In the example implementation of FIG. 4, the computing component 400 includes a hardware processor 402, and machine-readable storage medium 404. In some examples, computing component 400 may be an embodiment of processor 20 of node or edge node 10 (FIG. 1), and the node 10 may be operating in a distributed swarm learning blockchain network.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as but not limited to instructions 502-520 of FIG. 5, to control processes or operations for agreeing to a definition of conforming data and checking whether data is conforming, in order to determine whether the data qualifies as training data for a ML model 44 or 233A-N. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 404 may be a non-transitory storage medium, where the term "non-transitory" does not encompass transitory propagating signals. As described in detail below, machine-readable storage medium 404 may be encoded with executable instructions, for example, instructions 502-520 of FIG. 5.

Figure 5:
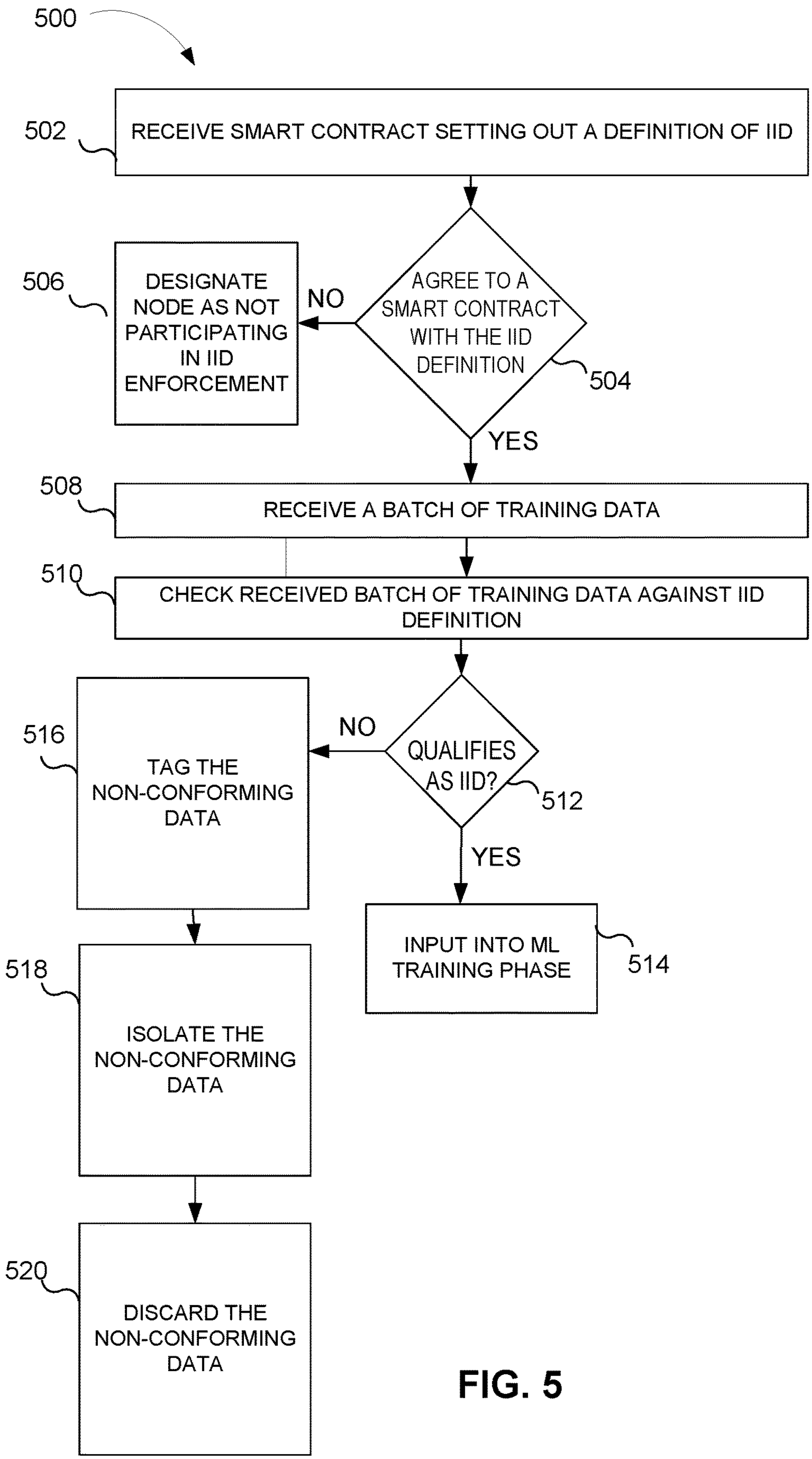
FIG. 5 illustrates a method for performing IID agreement and checking functions of a node in accordance with an example of the disclosed technology.

The remaining components of FIG. 4 will now be described in conjunction of the method of FIG. 5 which illustrates a method 500 for performing IID agreement and checking functions of a node 10 in accordance with an example of the disclosed technology. Step 502 may be performed for example by conformance configuration module 406 and includes receiving a smart contract that sets out a definition or criteria of conforming data based on the definition or criteria of IID stored in the IID configuration file 232 or 408. The definition or criteria for IID may be created by, e.g., a data scientist or human admin who then incorporates it into the smart contract. Accordingly, the node 10 agrees upon the definition of conforming data set out in the smart contract. By virtue of this agreement, IID conformance can be enforced. If the node 10 does not execute the smart contract then the node 10 may not participate in the parameter sharing of the SL network.

Step 504, which also may be performed by the conformance configuration module 406, determines whether the node 10 has agreed to the smart contract which includes the definition or criteria for IID. If NO then in Step 506 the node 10 is designated as a node 10 that does not participate in IID enforcement. If YES then in Step 508, which may be performed by the receiving module 410, the node 10 receives a batch of training data for training a machine learning model 44 or 233A-N. Training data can be in various forms. One non-limiting example is structured data from different verticals such as IoT, System Monitoring, Clinical Data, Health, etc.

In Step 510, which may be performed by detect module 412, the node 10 checks the batch of training data against the IID definition or criteria set out in the smart contract, in order to check whether the batch of training data conforms to the agreed-upon definition or criteria of conforming data. One non-limiting example is for structured data. Structured data can be measured like being bounded within the Min/Max of a univariate variable or even checking the integrity of multivariate variables by checking the correlation or covariance shifts. Another non-limiting example is for unstructured data such as images; it may be difficult or quite complex to filter the image at source. In such cases there can be knobs provided for aspects like batch training times, layer weights, etc., which might be indicators of IID data.

In Step 512, which also may be performed by the detect module 412, the node 10 determines whether the batch of training data qualifies as IID. If YES then in Step 514, which may be performed by output module 414, the training data is inputted into a training phase of a ML. Accordingly the conforming batches or sets of training data can be used to train a local version of a ML model 44 or 233A-N at the training node. In distributed or decentralized ML networks, training of a ML model at, e.g., an edge node, may entail training an instance or version of a common, global model using training data at the node 10. The training data may be a training data subset of local data at the node 10.

If the inquiry at Step 512 is NO then in Step 516 the data is tagged as non-conforming. In Step 518 non-conforming data is isolated and kept away from training. Steps 516 and 518 may be performed by tag and isolate module 416. Data that is tagged and/or isolated as non-conforming may be logged into a log or data sheet stored in non-IID database 418. In Step 520, which may be performed by discard module 420, non-conforming data is discarded and outputted to discard database 422.

Figure 6:
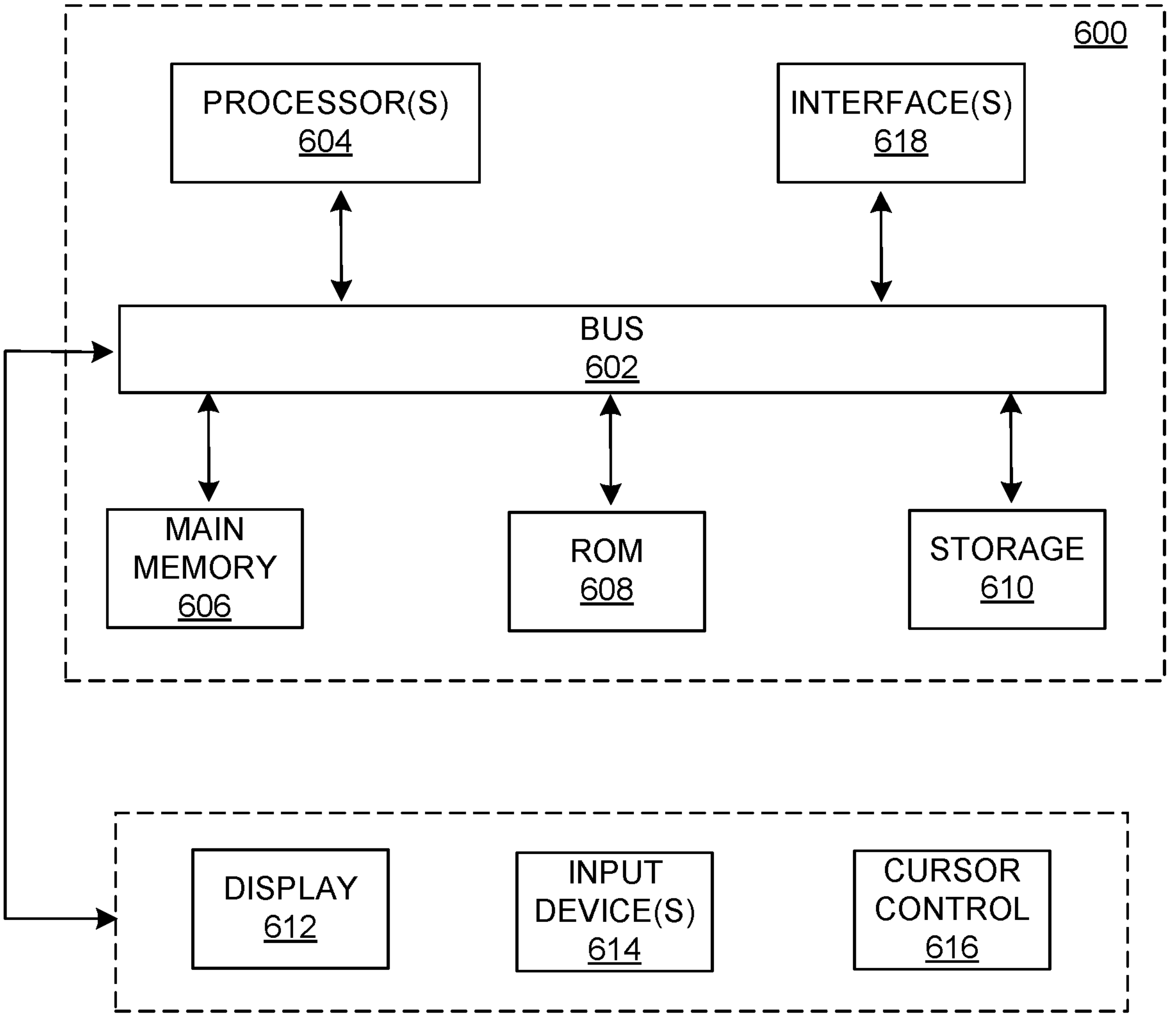
FIG. 6 is an example computing component that may be used to implement various features of examples described in the present disclosure.

FIG. 6 depicts a block diagram of an example computer system 600 in which various of the examples described herein may be implemented, including but not limited to node 10, SL framework with IID check 48, swarm learning component 236, IID check engine 238, and computing components 300 and 400. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An edge node operating in a distributed swarm learning blockchain network, comprising:

at least one processor; and a memory unit operatively connected to the at least one processor, the memory unit including instructions that, when executed, cause the at least one processor to:

receive a smart contract that includes a definition of independently and identically distributed (IID) data;

determine whether the edge node has agreed to the smart contract;

if the edge node has not agreed to the smart contract, designate the edge node as not participating in IID enforcement and parameter sharing in the distributed swarm learning blockchain network; and if the edge node has agreed to the smart contract:

execute the smart contract;

receive one or more batches of training data for training a machine learning model;

check whether each batch of training data conforms to the definition of IID data included in the executed smart contract, to determine IID batches of training data and non-IID batches of training data;

tag and isolate the non-IID batches of training data to keep the non-IID batches of training data from being used in training the machine learning model;

generate corrected batches of training data from the tagged non-IID batches of training data;

discard the tagged non-IID batches of training data;

input the corrected batches of training data into the check step at a later time;

train a local version of the machine learning model at the edge node using the IID batches of training data;

transmit parameters derived from the training of the local version of the machine learning model to a leader node;

receive, from the leader node, merged parameters derived from a global version of the machine learning model, wherein the global version of the machine learning model is isolated from the non-IID batches of training data; and apply the merged parameters to the local version of the machine learning model at the edge node to update the local version of the machine learning model, wherein discarding the tagged non-IID batches of training data keeps the non-IID batches of training data from being used to train the local version of the machine learning model or the global version of the machine learning model.

2. The edge node of claim 1, wherein tagging the non-IID batches of training data comprises marking the non-IID batches as non-conforming, and wherein the memory unit includes instructions that when executed further cause the at least one processor to list the non-conforming batches of training data in a log.

3. The edge node of claim 1, wherein the memory unit includes instructions that when executed further cause the at least one processor to share with other nodes in the network the parameters derived from training the local version of the machine learning model using the IID batches of training data.

4. The edge node of claim 1, wherein the smart contract comprises an IID configuration file that stores the definition of IID data.

5. The edge node of claim 1, wherein checking whether each batch of training data conforms to the definition of IID data comprises determining whether values of a univariate variable in the batch of training data are bounded within minimum and maximum bounds.

6. The edge node of claim 1, wherein checking whether each batch of training data conforms to the definition of IID data comprises checking integrity of multivariate variables in the batch of training data by checking correlation shifts or covariance shifts.

7. The edge node of claim 1, wherein checking whether each batch of training data conforms to the definition of IID data comprises evaluating a batch training time as an indicator of whether the batch of training data conforms to the definition of IID data included in the executed smart contract.

8. The edge node of claim 1, wherein checking whether each batch of training data conforms to the definition of IID data comprises evaluating layer weights generated during training using the batch of training data as indicators of whether the batch of training data conforms to the definition of IID data included in the executed smart contract.

9. The edge node of claim 1, wherein the IID batches of training data include one or more of the corrected batches of training data that are input into the check step and determined to conform to the definition of IID data included in the executed smart contract.

10. A method implemented by an edge node operating in a distributed swarm learning blockchain network, comprising:

receiving a smart contract that includes a definition of independently and identically distributed (IID) data;

determining whether the edge node has agreed to the smart contract;

if the edge node has not agreed to the smart contract, designate the edge node as not participating in IID enforcement and parameter sharing in the distributed swarm learning blockchain network; and if the edge node has agreed to the smart contract executing the smart contract that includes the definition of IID data;

receiving one or more batches of training data for training a machine learning model;

checking whether each batch of training data conforms to the definition of IID data included in the executed smart contract, to determine IID batches of training data and non-IID batches of training data;

tagging and isolating the non-IID batches of training data to keep the non-IID batches of training data from being used in training the machine learning model;

generating corrected batches of training data from the tagged non-IID batches of training data;

discarding the tagged non-IID batches of training data;

inputting the corrected batches of training data into the check step at a later time;

training a local version of the machine learning model at the edge node using the IID batches of training data;

transmitting parameters derived from the training of the local version of the machine learning model to a leader node;

receiving, from the leader node, merged parameters derived from a global version of the machine learning model, wherein the global version of the machine learning model is isolated from the non-IID batches of training data; and applying the merged parameters to the local version of the machine learning model at the edge node to update the local version of the machine learning model, wherein discarding the tagged non-IID batches of training data keeps the non-IID batches of training data from being used to train the local version of the machine learning model or the global version of the machine learning model.

11. The method of claim 10, further comprising listing the non-IID batches of training data in a log.

12. The method of claim 10, further comprising sharing with other nodes in the network the parameters derived from training the local version of the machine learning model using the IID batches of training data.

13. The method of claim 10, further comprising evaluating the updated local version of the machine learning model to determine a local validation loss value, and transmitting the local validation loss value to the leader node.

14. The method of claim 13, further comprising receiving, from the leader node, a global validation loss value determined based on the local validation loss value transmitted by the edge node.

15. A training node operating in a distributed swarm learning blockchain network, comprising:

at least one processor; and a memory unit operatively connected to the at least one processor, the memory unit including instructions that, when executed, cause the at least one processor to:

determine whether an edge node has agreed to a smart contract that includes a definition of independently and identically distributed (IID) data;

if the edge node has not agreed to the smart contract, designate the edge node as not participating in IID enforcement and parameter sharing in the distributed swarm learning blockchain network; and if the edge node has agreed to the smart contract;

execute the smart contract;

receive one or more batches of training data for training a machine learning model;

check whether each batch of training data conforms to the definition of IID data included in the executed smart contract, to determine IID batches of training data and non-IID batches of training data;

generate corrected batches of training data from the non-IID batches of training data;

discard the non-IID batches of training data;

input the corrected batches of training data into the check step at a later time;

train a local version of the machine learning model at a training node using the IID batches of training data;

transmit parameters derived from the training of the local version of the machine learning model to a leader node;

receive, from the leader node, merged parameters derived from a global version of the machine learning model, wherein the global version of the machine learning model is isolated from the non-IID batches of training data; and apply the merged parameters to the local version of the machine learning model at the training node to update the local version of the machine learning model, wherein discarding the non-IID batches of training data keeps the non-IID batches of training data from being used to train the local version of the machine learning model or the global version of the machine learning model.

16. The training node of claim 15, wherein the memory unit includes instructions that when executed further cause the at least one processor to tag the non-IID batches of training data.

17. The training node of claim 15, wherein the memory unit includes instructions that when executed further cause the at least one processor to isolate the non-IID batches of training data to keep the non-IID batches of training data from being used in training the machine learning model.

18. The training node of claim 15, wherein the memory unit includes instructions that when executed further cause the at least one processor to list the non-IID batches of training data in a log or discard the non-IID batches of training data.

19. The training node of claim 15, wherein the memory unit includes instructions that when executed further cause the at least one processor to share with other nodes in the network the parameters derived from training the local version of the machine learning model using the IID batches of training data.

20. The training node of claim 15, wherein the memory unit includes instructions that when executed further cause the at least one processor to:

evaluate the updated local version of the machine learning model to determine a local validation loss value;

transmit the local validation loss value to the leader node; and receive, from the leader node, a global validation loss value determined based on the local validation loss value transmitted by the training node.

* * * * *